3,183,284
MANUFACTURE OF CONTAINER GASKETS
Richard J. Haberlin, Weston, Mass., assignor to W. R. Grace & Co., Cambridge, Mass., a corporation of Connecticut
Filed Sept. 1, 1961, Ser. No. 135,501
3 Claims. (Cl. 264—28)

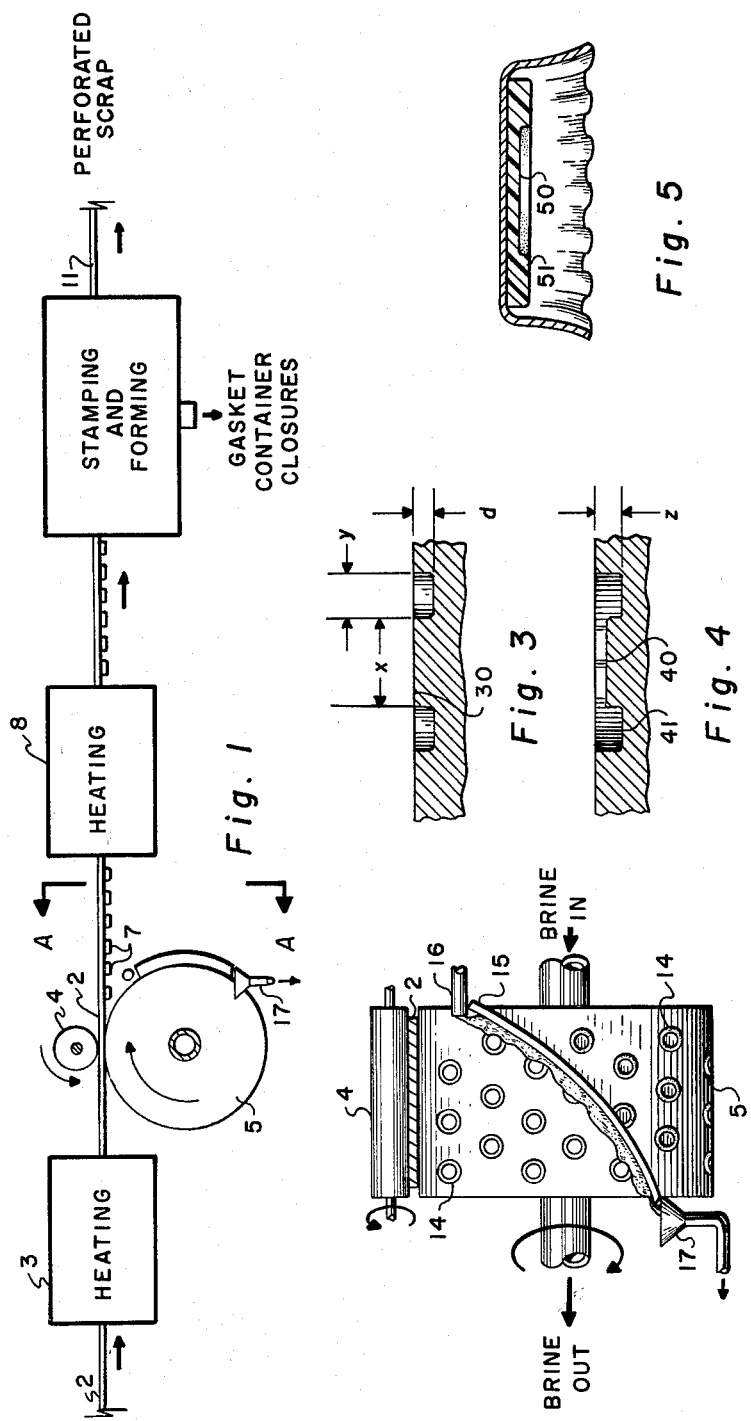

This invention pertains to the manufacture of relatively thick container gaskets such as those used in lug caps and crown closures. More particularly, this invention is concerned with a method of molding container gaskets and transferring them to a metal sheet from which container closures can then be formed.

It has been proposed in the past to form can ends and similar gaskets by printing a gasket-forming composition of the shape desired on flat sheet stock using methods akin to silk screen, intaglio, or gravure printing. The compositions so printed are then cured or otherwise converted to a resilient state and gasketed container closures are subsequently stamped from the sheet. While these methods of printing gaskets are capable of quite large volumes of production as compared to conventional die and nozzle lining methods of placing gaskets, they do have some disadvantages. It is difficult to produce gaskets having thicknesses over about 10 mils even when using two or more passes. The types of compounds that can be used are usually limited and must be tailored to fit the particular printing method. Also, 100 percent transfer of compound from the design or mold to the metal sheet is not usually achieved. This means that for long runs special care must be used to secure a uniform percent transfer of the compound and to prevent buildup of compound in the design. Depending on the method and gasket forming composition, adhesion of the shaped composition to the plate may be poor which can result in poor pick-out of the shapes from the design or mold cavity.

In the present invention relatively heavy container closure gaskets over about 10 mils thick are printed in one pass with 100 percent transfer per pass, by freezing the gasket forming composition in an intaglio design or mold cavity in a printing plate and then transferring the frozen shape to the metal sheet. The metal sheet receiving the shape is heated. When the printed surface contacts the metal sheet the exposed surface of the frozen gasket is melted which assures good adhesion and pick-out of the frozen shape. The frozen gasket shape on the metal sheet is then set to its elastomeric form by heat curing, fluxing or fusing. In some cases, chemical cures can be used.

The gasket forming compositions can be plastic to pseudoplastic. They are preferably thixotropic. When plastic materials are used, it is desirable to maintain yield values in the range of 0.005 pound per square inch to 0.25 pound per square inch. When yield values become excessively high, e.g. 0.5 pound per square inch, two phenomena are observed. The plastic material will not flow over the surface of the roll correctly and often does not even wet the roll surface because of cavity formation resulting from rotation of the roll in the compound reservoir. Secondly, air entrainment in the mold cavities is a problem. A further complication arises because the chilled compound will not flow into the recycling funnel.

Pseudoplastic materials are satisfactory if their low point viscosity (between melting and thermo-conversion) is sufficiently high to prevent flow or if the thermo-conversion takes place with sufficient speed to minimize flow out.

Thixotropic formulations are ideal. Their lack of yield value coupled with their low viscosity under shear permits wetting of the roll, recirculation of excess compound and excellent contour stability during the shear-free melting and thermo-conversion steps. Viscosity ratios in excess of 3–1 have been found to behave satisfactorily in the higher viscosity ranges (20,000–40,000 cps. Brookfield LVF 5X #4, 60 r.p.m., 75° F.) while ratios of over 8 to 10–1 are satisfactory for lower viscosity values (2,000–10,000 cps.). The yield value for the thixotropic materials should be less than 0.050 pound per square inch.

The viscosity-shear characteristic of the compound can be more precisely identified by saying that its PIRV [1] slope is within the range of 0.65 to 1.0, preferably 0.75 to 0.90. The Precision Interchemical Rotary Viscometer measures the shear stress of a compound over a range of shear rates. The PIRV slope is the logarithmic rate of change of the shear stress with the shear rate as determined by plotting on log-log paper the shear stress in dynes per square centimeter against the shear rate in reciprocal seconds.

It is preferred that the composition be capable of undergoing at least a slight shrinkage, 1 percent or more, upon freezing which facilitates the release of the frozen shapes from the mold. The other physical properties of the gasket forming composition used, and its constituents, can be varied quite widely. The ingredients in the composition can be readily adjusted to conform to the temperature differences one wishes to employ in the printing process. Fluid gasket forming compositions in the form of latex, solvent dispersion (plastisol), solution, emulsion, peptized rubber, and similar systems can be used in the present method.

In brief compass, this invention is an improvement in the manufacture of container gaskets wherein mold cavities in a dimensionally stable printing surface are filled with a fluid gasket forming composition and thereafter the printing surface is brought into contact with the surface of a metal sheet which is to receive the molded shapes. The improvement of this invention comprises maintaining the printing surface at a temperature at least 100° F. preferably 150° F., below the temperature at which the composition is supplied. This causes the composition, when in the mold cavities, to be immediately shock chilled or frozen to coherent shapes while undergoing some shrinkage. The metal sheet which is to pick up the frozen shapes is maintained at a temperature sufficiently high to rapidly soften the exposed surfaces of the chilled shapes whereby they adhere to said sheet.

While the method of this invention is inclusive of flat bed printing, it is much preferred to use rotary printing methods because they permit continuous operation.

The mold cavities are preferably filled by doctoring the composition using a rigid doctoring knife. It is difficult, however, to get uniform filling of the cavities and to avoid bubble entrapment. It has been found that if the doctor blade is set at an angle of 75 degrees to 30 degrees to the path of its motion with respect to the printing surface, the gasket forming composition is forced into the cavity at an angle—that is, the force pushing the compound into the cavity has vector components in the direction of the path of relative motion of the printing surface and perpendicular to the path—with the result that the mold cavities are much more uniformly filled. This use of an angled doctor blade is a subordinate feature of this invention.

The present invention will become clear from the following discussion and description of the drawings attached to and forming a part of this specification. In the drawings:

FIGURE 1 schematically illustrates the container gasket printing process of this invention;

---
[1] Precision Interchemical Rotary Viscometer, See: "Precision Scientific Company Instruction Manual," Cat. #64945, W. B. Barish, issued 6–14–55, Precision Scientific Co., 3737 W. Cortland St., Chicago 47, Ill.

FIGURE 2 is an end view of the printing wheel taken along line AA of FIGURE 1;

FIGURE 3 is a cross sectional view of one form of an intaglio design in the printing surface useful for forming lug or twist cap gaskets;

FIGURE 4 is a cross sectional view of another mold cavity design suited for forming crown closure liners; and FIGURE 5 is a cross sectional view of a crown closure made in accordance with the teachings of this invention.

Referring to FIGURE 1, a metal sheet 2 such as tin plate or aluminum sheet, is heated in an oven 3 or by lamps or strip heaters. It is then passed between an impression roll 4 and a prinitng roll 5 where its underside is brought into contact with frozen gaskets contained in the surface of roll 5. The temperature of sheet 2 is such as to at least soften and partially liquefy the surface of the frozen shapes which causes them to adhere to the underside of the sheet and assures that they are picked out of their cavities. All of the composition in the cavities is completely removed leaving them clear for the next cycle. Buildup of the gasket-forming composition in the cavities in not a problem.

The sheet with the adhering frozen gasket shapes 7 then passes on to means for converting the shapes to a form that is solid and elastomeric or rubber-like at room temperature. In this case an oven 8 is used. Assuming the composition is a plastisol, it can be heated to a temperature in the range of 330 to 380° F. to flux it. If a latex containing a curing agent has been used as the gasket forming composition, it can be heated after being dried to a temperature in the range of 250 to 350° F. for a time of 3 to 12 minutes to cure it. Thereafter the sheet is passed to a stamping machine 9 wherein gasketed container closures, such as crown closures, are cut out and formed from the sheet. The gasketed container closures are removed at 10 and the perforated scrap at 11.

With reference to both FIGURES 1 and 2, the printing wheel comprises a chilled roll 5 the surface of which contains a multiplicity of mold cavities or intaglio designs 14 of the desired shape. These cavities can be formed in the surface of the wheel by engraving, drilling, etching, and similar methods. The arrangement or the pattern of the cavities is such that they will register with the subsequent stamping and container closure forming operations. After passing in contact with sheet 2, the cavities are refilled by doctoring the gasket-forming composition into them using a knife 15 set at an angle to the direction of rotation of the drum. The knife is concave and closely conforms to the surface of the drum.

The gasket forming composition is supplied to the leading edge of knife 15 by pipe 16 at a temperature at least 100° F. higher than the lowest surface temperature of the roll. It flows down the knife and is forced into the cavities. Excess compound is removed from the trailing edge of the knife 15 for recycle by collection funnel 17.

The surface of roll 5 is chilled by any convenient means; for example, by circulating a brine solution, acetone-Dry Ice mixture, liquid nitrogen and the like within roll 5. The surface temperature of the roll may be as low as −175° F. just prior to its contact with sheet 2. The temperature differential required between the temperature at which the gasket-forming composition is supplied and the roll temperature will depend upon the properties of the composition and the rate of freezing needed. The latter will depend interalia on the speed of rotation of the drum, the drum diameter, and the volume of compound in each cavity. The time required to freeze the composition in the cavity is preferably less than 5 seconds after filling.

In order to permit good doctoring of the background of the roll, it is desirable not to have freezing occurring too rapidly. The doctor blade is preferably placed as close to the last point of contact of sheet 2 with the roll so that some of the surface heat imparted to the roll by sheet 2 will remain during the doctoring. Doctor blade 15 can also be heated, e.g., electrically, to prevent compound from solidifying as it moves down along the blade. Generally, it is preferred to use printing rolls having a diameter of at least 2 feet and to permit the compound to remain resident in the mold cavities for at least 225 degrees of revolution after leaving the doctor blade and before contacting the heated sheet. The speed used can be in the range of 30 to 500 linear feet per minute.

The arrangement shown in FIGURE 1 may be reversed so that the gasket shapes are printed on the top side of sheet 2.

FIGURE 3 is a cross sectional view of an intaglio design engraved in the surface of the wheel that can be used to form gaskets for lug caps. The design is for a circular gasket. Note that the center portion 30 of the design is on level with the background of the wheel. The gasket design can have an internal diameter $x$ of 0.7 to 2.65 inches and a band width $y$ of 0.2 to 0.33 inch. The depth $d$ of the cavity can be in the range of 10 to 50 mils such that it will contain in the range of 0.005 to 0.150 cubic inch of compound. For compounds having a solids content (ratio of wet film weight/dry film weight) in the range of 60 to 100 percent this size of cavity will result in gasket thicknesses generally greater than about 10 mils.

FIGURE 4 illustrates a design that can be used to form crown liners. The outside diameter of the design can be 1.047 inches and the inside diameter of the sealing ring may be 0.75 to 0.84 inch. The depth $z$ of the sealing ring cavity can be 20 to 50 mils and the center portion 4 can be depressed 2 to 7 mils from the surface of the wheel to provide a continuous center portion that will serve to protect the panel of the crown.

FIGURE 5 shows a completed crown closure formed from the gasket design of FIGURE 4. The built-up portion 51 in the sealing area corresponds to depressed portion 41 and the panel portion 50 corresponds to depressed portion 40 of FIGURE 4.

The present invention is particularly suited to the manufacture of relatively small gaskets. It is preferred to work with gasket designs presenting a surface area of contact of the molded shape to the metal strip of less than 4 square inches. To facilitate the freezing action, it is preferred to use designs so arranged that any point within the volume encompassed by the design is no more than 150 mils from the nearest wall.

While the manufacture of circular gaskets has been illustrated, it will be appreciated that this invention is also particularly suited to the manufacture of non-round shapes, such as square gaskets for electrical conduit junction box covers, which are difficult to form by nozzle lining techniques.

*Example*

Crown closures having a thickness of 40 mils in the sealing area are formed as follows: the printing wheel has a width of 7.375 inches and a diameter of 2.4 feet. It is formed from a 0.375 inch thick aluminum shell in which ethyl alcohol at a temperature of −75° F. is circulated. The engraved crown liner designs are as illustrated in FIGURE 4. They have an outside diameter of 1.044 inches. The panel portion has a diameter of 0.750 inch and a depth of 4 mils. The depth of the design in the sealing area is 40 mils. Five rows of cavities are used across the width of the drum staggered on a 30° line to match the punched line of the crown stamping machine (Johnson). The centers of the crown are spaced 1.531 inches apart on the 30° diagonal, 2.656 on the die centers in rows so that the surface of the drum contains a total of 270 cavities. (90 form one design, and three repeats are used.)

The doctor blade is set at an angle of 45 degrees from the direction of rotation and is substantially perpendicular (in cross section view) to the tangent at the point of contact, as is shown in FIGURE 2. The doctor blade is fabricated of a polycarbonate (Delrin). The leading edge of the blade is located 40 degrees of rotation from the last point of contact of the sheet with the drum. The drum speed is 60 linear feet per minute. 3.5 pounds per minute of the gasket forming compound is supplied to the leading edge of the doctor knife at a temperature of 120° F.

The metal sheet to receive the frozen shapes is 90 pound tin plate. It is heated and has a temperature just prior to contact with the wheel of 285° F.

A plastisol gasket forming composition is used. It consists of 55 weight percent of dispersion grade polyvinyl resin (Geon 121—Goodrich Chemical Company) admixed with 35 percent of di-2-ethyl hexylphthalate, 6.5 percent titanium dioxide, 0.25 percent activated carbon black and 2.5 percent of a refined paraffin wax. The composition is prepared by first melting the wax in about one-third of the plasticizer at 151° F. and then blending the remaining ingredients in at about 122° F. followed by immediate cooling. This compound has a specific gravity of 1.27 and freezes at a temperature of −40° F. It has a yield point of 0.008 pound per square inch at 75° F. It can be fused at a temperature in the range of 350 to 380° F. in 1.5 minutes in a gas fired forced hot air oven.

The tin plate after picking up the gaskets on its underside from the wheel is heated to a temperature of 385° F. to set the shapes to their rubber-like form. Thereafter crown closures, as illustrated in FIGURE 5, are stamped from the sheet. Each gasket on the average contains 0.009 ounce of compound.

Having described this invention, what is sought to be protected by Letters Patent is succinctly set forth in the following claims.

What is claimed is:

1. A method of forming a multiplicity of gaskets on a form-stable sheet comprising: providing a multiplicity of mold cavities of the desired shape in a printing surface, filling said mold cavities with a gasket-forming composition supplied at a temperature at least 100° F. higher than the temperature of said printing surface, shock chilling said gasket forming composition to form-stable shapes in said mold cavities, thereafter contacting the exposed surfaces of the chilled shapes with a form-stable sheet heated to a temperature sufficient to at least soften said exposed surfaces and cause said chilled shapes to adhere thereto, disengaging said sheets and adhering shapes from said printing surface and treating said adhering shapes to convert them to gaskets which are form-stable at room temperatures.

2. In the manufacture of container gaskets by filling mold cavities in a cylindrical printing surface with a fluid gasket-forming composition and thereafter rotatively contacting the printing surface with the surface of a sheet which is to receive the molded shapes; the improvement comprising maintaining said printing surface at a temperature at least 100° F. below the temperature at which said composition is supplied, the composition in said mold cavities being thereby immediately shock chilled to coherent shapes while undergoing some shrinkage and maintaining the temperature of said sheet sufficiently high to rapidly soften the exposed surfaces of the chilled shapes in said mold whereby they will adhere to said sheet.

3. The process of claim 2 wherein said compound is forced into said cavity by doctoring while said printing surface is rotating, the doctor blade being disposed at an angle in the range of 30 to 80 degrees from the direction of rotation of said printing surface and extending across the width of the printing surface while closely conforming thereto.

References Cited by the Examiner

UNITED STATES PATENTS

| | | | |
|---|---|---|---|
| 2,187,146 | 1/40 | Calcott et al. | 264—28 |
| 2,251,785 | 8/41 | Dons et al. | 264—28 |
| 2,528,506 | 11/50 | Foye | 264—268 |
| 2,688,776 | 9/54 | Evans et al. | 18—59 |
| 2,865,046 | 12/58 | Bird | 264—214 |

FOREIGN PATENTS 712,865   8/54   Great Britain.

ROBERT F. WHITE, *Primary Examiner.*

MICHAEL V. BRINDISI, ALEXANDER H. BRODMERKEL, *Examiners.*